United States Patent
Nakatani

(10) Patent No.: US 7,961,567 B2
(45) Date of Patent: Jun. 14, 2011

(54) OPTICAL DISK APPARATUS

(75) Inventor: Morio Nakatani, Ichinomiya (JP)

(73) Assignee: Sanyo Electric Co., Ltd., Osaka (JP)

(*) Notice: Subject to any disclaimer, the term of this patent is extended or adjusted under 35 U.S.C. 154(b) by 798 days.

(21) Appl. No.: 11/873,913

(22) Filed: Oct. 17, 2007

(65) Prior Publication Data
US 2008/0094954 A1 Apr. 24, 2008

(30) Foreign Application Priority Data
Oct. 18, 2006 (JP) ................. 2006-283795

(51) Int. Cl.
G11B 7/00 (2006.01)
(52) U.S. Cl. .................. 369/44.32; 369/53.35
(58) Field of Classification Search ........... 369/44.32, 369/44.33, 53.35, 53.36
See application file for complete search history.

(56) References Cited

U.S. PATENT DOCUMENTS
2008/0049936 A1* 2/2008 Naganuma et al. ........... 380/210

FOREIGN PATENT DOCUMENTS
JP 6-267243 9/1994
JP 2004-005771 1/2004
* cited by examiner Primary Examiner — Adam R Giesy
(74) Attorney, Agent, or Firm — Ditthavong Mori & Steiner, P.C.

(57) ABSTRACT

In an optical disk apparatus according to an exemplary embodiment of the invention, a management information retaining unit retains an information group which should regularly be recorded as disk management information. The disk management information is obtained from a disk loaded in the optical disk apparatus, and the obtained disk management information and the information group retained by the management information retaining unit are compared with each other to detect an error in the disk management information obtained from the disk. The detected error of the disk management information is corrected into regular information, and recording and reproducing operations are performed to the disk based on the corrected disk management information.

6 Claims, 6 Drawing Sheets

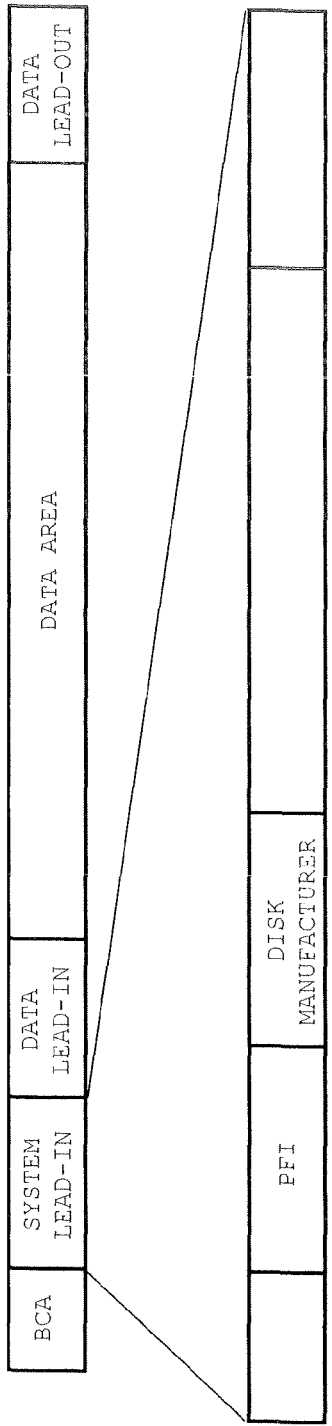
FIG. 2A    STRUCTURE OF SYSTEM LEAD-IN
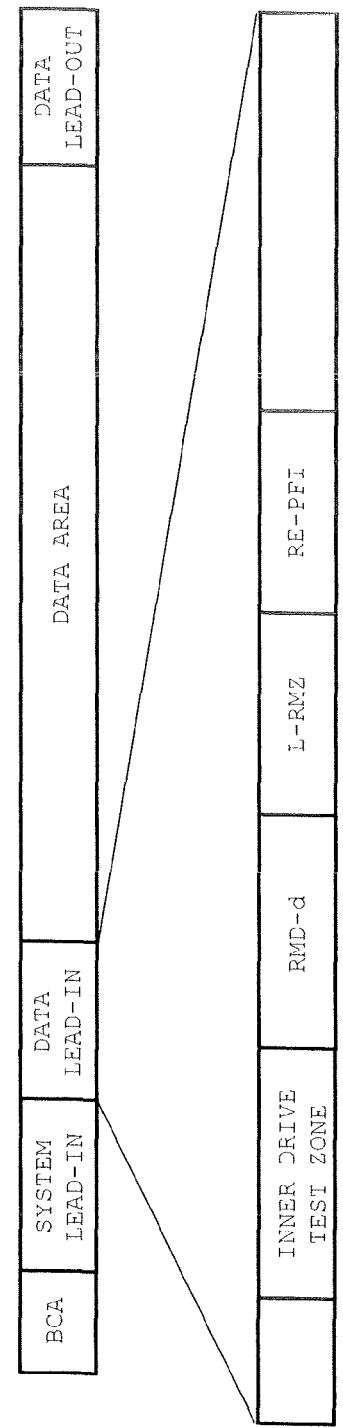
FIG. 2B    STRUCTURE OF DATA LEAD-IN

FIG. 4

| ITEM | SPECIFIED VALUE | POSSIBILITY OF CORRECTION | DETERMINATION WHEN CORRECTION CANNOT BE PERFORMED ||
|---|---|---|---|---|
| | | | POSSIBILITY OF REPRODUCTION | POSSIBILITY OF RECORDING |
| START ADDRESS OF DATA AREA | 30000h | POSSIBLE | POSSIBLE | IMPOSSIBLE |
| END ADDRESS OF DATA AREA (N) | 73543F | POSSIBLE | POSSIBLE | IMPOSSIBLE |
| END ADDRESS OF DATA AREA (A) | 73183F | POSSIBLE | POSSIBLE | IMPOSSIBLE |
| ... | ... | ... | ... | ... |

OPTICAL DISK APPARATUS

This application claims priority under 35 U.S.C. Section 119 of Japanese Patent Application No. 2006-283795 filed Oct. 18, 2006, entitled "OPTICAL DISK APPARATUS".

BACKGROUND OF THE INVENTION

1. Field of the Invention

The present invention relates to an optical disk apparatus, particularly to the optical disk apparatus which is suitably used to record and reproduce information in and from a recordable optical disk.

2. Description of the Related Art

Currently, various optical disks are commercialized as a large-capacity recording medium. Examples of the commercialized optical disk include a write once read many optical disk such as CD-R (Compact Disc-Recordable) and DVD-R (Digital Versatile Disc-Recordable) and a rewritable optical disk such as CD-RW (CD-ReWritable) and DVD-RW (DVD-ReWritable). Recently, HDDVD (High-Definition Digital Versatile Disc)-R, HDDVD-RW, and a Blu-ray disk are being developed as the larger-capacity recordable disk for the market.

In such disks, disk management information recorded in a data lead-in area is read during recording and reproduction, and recording and reproducing operations are performed to the disk based on the disk management information. At this point, where an error exists in the disk management information, for example, there is generated such a trouble that previous data is overwritten in an already-recorded area. Therefore, when the error is detected in the disk management information obtained from the disk, usually a user is informed of error, or the disk is forcedly discharged from a drive to stop the recording and reproducing operations for the disk.

The error in the disk management information is generated by the following causes. For example, in HDDVD-R, PFI (Physical Format Information) in pieces of information recorded by pits in a system lead-in area is directly recorded in the data lead-in area. Usually PFI read from the system lead-in area is tentatively stored in a memory, and pieces of PFI data in the memory are sequentially written in the data lead-in area to perform the recording of PFI. PFI includes a space area (reserve area) because of a format. In the case where the drive performs a process so as to map only the data except for the space area on the memory, unnecessary data is included at a position on the memory which should originally be the space area, when data caused by a noise or the like remains at the position on the memory corresponding to the space area. In this state of things, when the data on the memory is written in the data lead-in area, PFI includes the unnecessary data at the position which should originally be the space area after writing the data.

Additionally, when current surge occurs during the recording operation of the disk management information, there is generated a phenomenon that "1" is recorded at the position where "0" should originally be recorded. In this case, the error is also generated in the disk management information on the disk.

When the error is generated in the disk management information, as described above, the process of stopping the recording and reproducing operations is performed to the disk on the drive side. In this case, a user cannot read the information from the disk, and the user loses the large volumes of recording data. In the case where the data cannot be recorded in the disk, large volumes of disk property are wasted. Furthermore, in the case where the recording and reproducing operations cannot be performed, sometimes the user recognizes that the disk is not compatible with the drive.

SUMMARY OF THE INVENTION

The present invention is made to solve the above problems. When an error exists in disk management information, an optical disk apparatus according to an exemplary embodiment of the invention performs recording and reproducing operations in a range in which no obstacle is brought about to the recording and reproducing operations. That is, in the case where the error is not fatal to the recording and reproduction, the error is appropriately corrected, and the recording and reproducing operations are performed based on the corrected disk management information. The corrected disk management information is appropriately updated and recorded in the disk. In the case where the disk is loaded in another drive, suspension of the recording and reproducing operations caused by the error of the disk management information is avoided as much as possible. According to the invention, even if the error is generated in the disk management information, the recording and reproducing operations can smoothly be realized by managing the disk management information in the above manner.

An optical disk apparatus according to an aspect of the invention which records and reproduces information in and from a recordable disk, the optical disk apparatus includes a management information obtaining unit which obtains disk management information from a disk loaded in the optical disk apparatus, the disk management information being used to manage information already recorded in the disk; a management information retaining unit which retains an information group which should regularly be recorded as the disk management information in the disk; an error detection unit which compares the disk management information obtained by the management information obtaining unit with the information group retained by the management information retaining unit to detect an error in the disk management information obtained from the disk; an error correction unit which corrects the error of the disk management information detected by the error detection unit into regular information; and a recording and reproducing control unit which performs recording and reproducing operations to the disk based on the disk management information corrected by the error correction unit.

The management information obtaining unit, the management information retaining unit, the error detection unit, the error correction unit, and the recording and reproducing control unit in the aspect of the invention are implemented by a controller 111 in an exemplary embodiment described later. At this point, the information retained by the management information retaining unit is stored as a specified value list in an embedded memory of the controller 111.

BRIEF DESCRIPTION OF THE DRAWINGS

The above and other objects and novel features of the invention will be apparent from the following detailed description of preferred embodiments of the invention in conjunction with the accompanying drawings:

FIGS. 2A and 2B show data structures of a system lead-in area and a data lead-in area according to an exemplary embodiment;

FIG. 4 shows a configuration of a specified value list according to an exemplary embodiment;

However, the drawings are used for the purpose of illustration only, and the drawings are not intended to restrict the scope of the invention.

DESCRIPTION OF THE PREFERRED EMBODIMENTS

An exemplary embodiment of the invention will be described below with reference to the drawings. In the exemplary embodiment, the invention is applied to an optical disk apparatus which performs the recording and reproduction to HDDVD-R.

Figure 1:
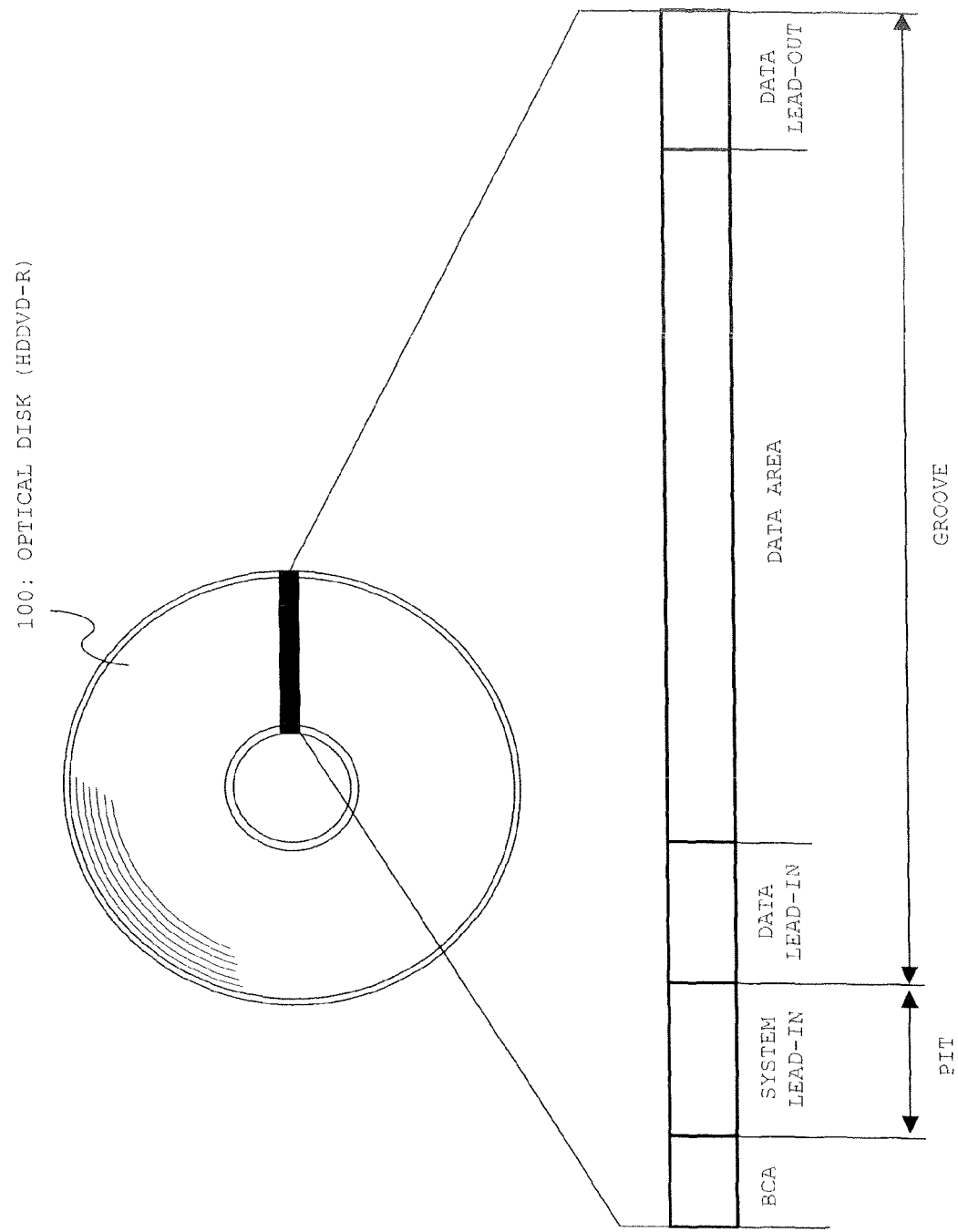
FIG. 1 shows an area format of an optical disk according to an exemplary embodiment of the invention.

FIG. 1 shows an area format of an optical disk 100.

As shown in FIG. 1, the disk 100 is divided into BCA (Burst Cutting Area), a system lead-in area, a data lead-in area, a data area, and a data lead-out area in a radial direction.

An outer circumferential area outside BCA is divided into an area (system lead-in area) where pits are formed and an area (data lead-in area, data area, and data lead-out area) where a groove is formed. Hereinafter the area where the pits are formed is referred to as "pit forming area" and the area where the groove is formed is referred to as "groove forming area".

A spiral track (groove) is formed from an inner circumference toward an outer circumference in the groove forming area, and the recording and reproduction of user data are performed to the track. The track is wobbled in the disk radial direction, and address information is retained by the wobble. That is, a phase modulation interval called ADIP (Address in pre-groove) is inserted at constant periods in a monotonous wobble interval. The address information on the track is read and reproduced from a change in intensity of reflected light when the phase modulation interval is scanned with a beam.

A number of a written standard with which the disk is compatible, a disk type and the like are recorded in BCA. The optical disk apparatus can determine the disk type and the like by reading BCA in loading the disk.

In addition to the compatible written standard number and the disk type, information on the recording and reproduction of the disk is recorded by the pits in the system lead-in area. Examples of the information includes a recording speed and a reflectance applied to the disk, optimum recording and reproducing powers, Write Strategy, a setting of a recording area, and identification information on a disk manufacturer. The optical disk apparatus obtains the information necessary for the recording and reproduction in addition to the disk type by reproducing the system lead-in area in loading the disk.

Information (disk management information) for managing the disk is recorded in the data lead-in area. User data is recorded in the data area. Information indicating that that is the data lead-out area is recorded in the data lead-out area, and an outer drive test zone which is of a test writing area for an outer circumferential portion is also set in the data lead-out area.

FIG. 2A shows a structure of data recorded in the system lead-in area. As shown in FIG. 2A, a PFI (Physical Format Information) area and a disk manufacturer information area are set in the system lead-in area.

In addition to the number of the written standard with which the disk is compatible and the disk type, disk characteristics, a recording setting condition, and a reproducing setting condition are recorded in the PFI area. A name of the disk manufacturer and the disk number are recorded in the disk manufacturer information area.

The optical disk apparatus recognizes the disk characteristics by obtaining the pieces of information from the system lead-in area, and the optical disk apparatus performs the optimum recording and reproducing operations to the disk based on the disk characteristics. The pieces of information are recorded in the disk in the form of the pit on the disk manufacturer side.

FIG. 2B shows a structure of data recorded in the data lead-in area. As shown in FIG. 2B, an inner drive test zone, an RMD-d (Recode Management Data-duplication) area, L-RMZ (Lead-in Recode Management Zone), and RE-PFI area are set in the data lead-in area.

Information for specifying the position where the latest RMD (Record Management Data) is recorded is recorded in the RMD-d area. L-RMZ is an RMD recording area in the data lead-in. Usually, in the recording operation, RMD is updated, and the updated RMD is recorded in L-RMZ. RMD is information for managing the recording state, and RMD includes information for managing the data area and information for specifying the drive which performs the recording. The data retained in the PFI area of the system lead-in area is directly copied and recorded in the RE-PFI area.

When the disk is loaded, the optical disk apparatus accesses the RMD-d area of the data lead-in area to obtain the information on the position where the latest RMD is recorded. Then, the optical disk apparatus accesses the obtained recording position to obtain the latest RMD. Then, the optical disk apparatus recognizes the data area state based on the latest RMD, and the optical disk apparatus obtains information on possibility of recording to the disk and a start address of a recordable area.

When a user inputs a recording command, the optical disk apparatus performs the recording operation to the user area based on the recording command. At this point, RMD is appropriately updated by the recording. The updated RMD is recorded in L-RMZ after the recording operation. Thanks to the update recording, the optical disk apparatus can appropriately set an RMD recording area (U-RMZ) in the data area when the RMD recording area is decreased in L-RMZ. In the case where a border dividing the data area is set, the optical disk apparatus can also set the RMD recording area (B-RMZ) in the border. In this case, the position where the latest RMD is recorded exists outside the data lead-in area. The information for specifying the position is recorded in the RMD-d area.

Figure 3:
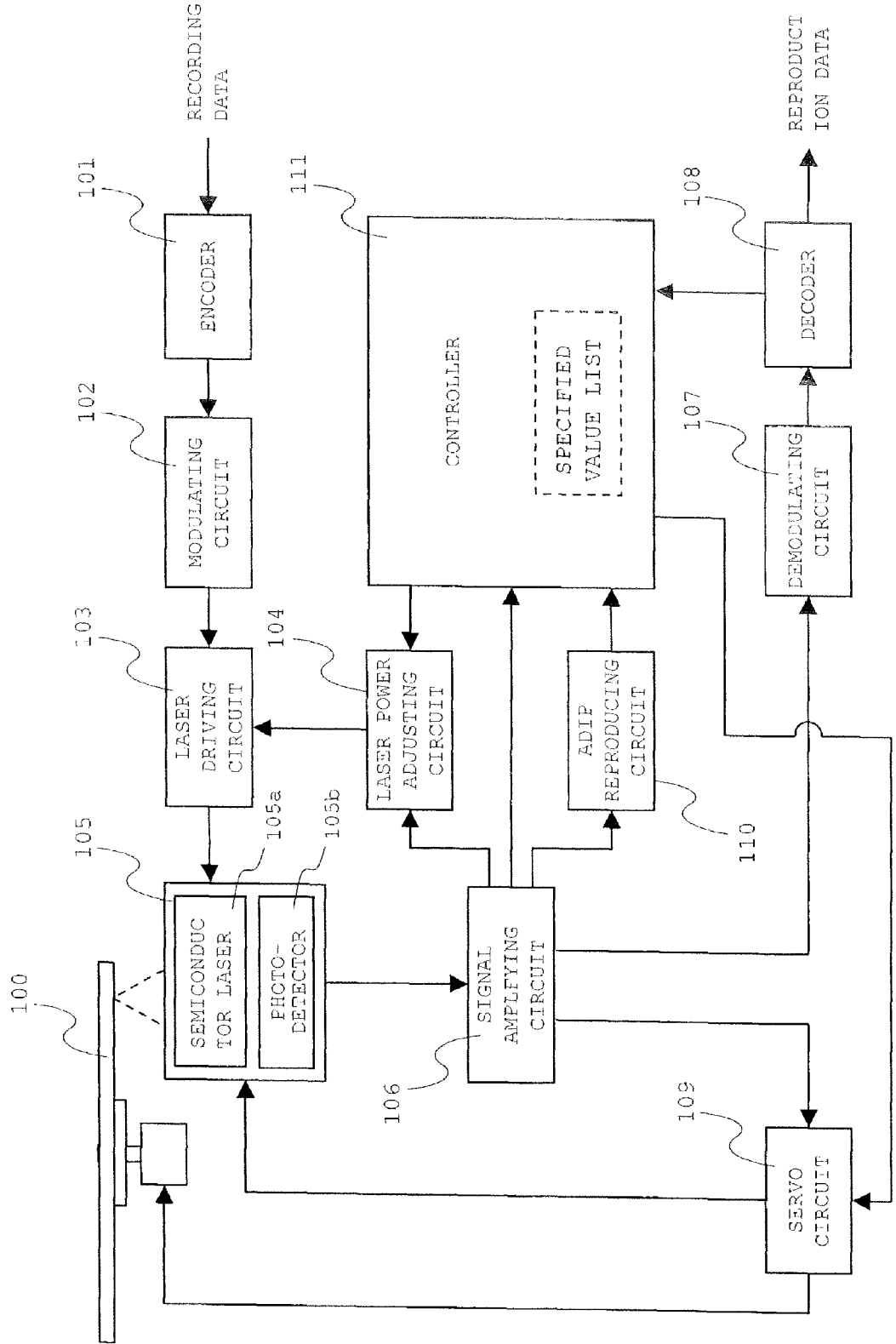
FIG. 3 shows a configuration of an optical disk apparatus according to an exemplary embodiment.

FIG. 3 shows a configuration of an optical disk apparatus according to an exemplary embodiment.

Referring to FIG. 3, the optical disk apparatus includes an encoder 101, a modulating circuit 102, a laser driving circuit 103, a laser power adjustment circuit 104, an optical pickup 105, a signal amplifying circuit 106, a demodulating circuit 107, a decoder 108, a servo circuit 109, an ADIP reproducing circuit 110, and a controller 111.

The encoder 101 performs an encoding process such as addition of an error correction code to the inputted recording data, and the encoder 101 outputs the recording data to the modulating circuit 102. The modulating circuit 102 performs predetermined modulation to the inputted recording data, and the modulating circuit 102 generates a recording signal to output the recording data and the recording signal to the laser driving circuit 103.

The laser driving circuit 103 outputs a driving signal to a semiconductor laser 105a according to the recording signal from the modulating circuit 102 during the recording, and the laser driving circuit 103 outputs the driving signal to the semiconductor laser 105a to emit a laser beam having a constant intensity during the reproduction. At this point, the laser powers during the recording and reproduction are controlled by a signal from the laser power adjustment circuit 104. The laser power adjustment circuit 104 outputs the signal for defining the laser powers during the recording and reproduction to the laser driving circuit 103 according to a command from the controller 111.

The optical pickup 105 includes the semiconductor laser 105a and a photodetector 105b, and the optical pickup 105 causes the laser beam to converge on the track to perform the recording and reproduction of the data to the disk. The optical pickup 105 also includes an objective lens actuator and an optical system. The objective lens actuator adjusts the state in which the track is irradiated with the laser beam. The optical system guides, to the objective lens, the laser beam emitted from the semiconductor laser 105a and guides the light reflected from the disk 100 to the photodetector 105b.

The signal amplifying circuit 106 amplifies the signal received from the photodetector 105b and performs a computing process to the signal to generate various signals, and the signal amplifying circuit 106 outputs the signals to the corresponding circuits. The demodulating circuit 107 generates reproduction data by demodulating a reproduction RF signal inputted from the signal amplifying circuit 106, and the demodulating circuit 107 outputs the reproduction data to the decoder 108. The decoder 108 performs a decoding process such as error correction to the data inputted from the demodulating circuit 107, and the decoder 108 outputs the data to a subsequent circuit. The decoder 108 outputs the pieces of data reproduced from the system lead-in area and the data lead-in area to the controller 111.

The servo circuit 109 generates a focus servo signal and a tracking servo signal from a focus error signal and a tracking error signal which are inputted from the signal amplifying circuit 106, and the servo circuit 109 outputs the focus servo signal and the tracking servo signal to the objective lens actuator of the optical pickup 105. The servo circuit 109 also generates a motor servo signal from a wobble signal inputted from the signal amplifying circuit 106, and the servo circuit 109 outputs the motor servo signal to the disk driving motor. The ADIP reproducing circuit 110 reproduces address information from the wobble signal inputted from the signal amplifying circuit 106, and the ADIP reproducing circuit 110 outputs the address information to the controller 111.

The controller 111 includes CPU (Central Processing Unit) and an embedded memory. The controller 111 stores various kinds of data in the embedded memory, and the controller 111 controls each unit according to a previously set program. A specified value list is stored in the embedded memory of the controller 111. The specified value list retains an information group which should regularly be retained in the data lead-in area as the information for managing the disk (disk management information).

FIG. 4 shows a configuration of the specified value list. As shown in FIG. 4, the specified value list includes "item", "specified value", "possibility of correction", "possibility of reproduction", and "possibility of recording" while "item", "specified value", "possibility of correction", "possibility of reproduction", and "possibility of recording" are correlated with one another.

As used herein, the "item" shall mean an item of each piece of information retained as the disk management information. The "specified value" shall mean a specified value of the disk management information corresponding to the item. The "possibility of correction" shall mean information for defining whether or not an error is corrected when the error exists in the disk management information corresponding to the item. The "possibility of reproduction" shall mean information for defining whether or not the reproducing operation is permitted when the error in the disk management information corresponding to the item cannot be corrected. The "possibility of recording" shall mean information for defining whether or not the recording operation is permitted when the error in the disk management information corresponding to the item cannot be corrected.

In FIG. 4, the item of "start address of data area" has the specified value of "30000h". In the case where the error exists in the item of "start address of data area" of the disk management information obtained from the disk, because the "possibility of correction" is "possible", the disk reproducing apparatus is permitted to correct the error. In the case where the error which cannot be corrected exists in the item of "start address of data area", because the "possibility of reproduction" is "possible", the disk reproducing apparatus is permitted to perform the reproducing operation of the disk. On the other hand, because the "possibility of recording" is "impossible", the disk reproducing apparatus cannot perform the recording operation to the disk.

The items included in the specified value list are one which is correlated with or affects the recording and reproducing operations in the information group constituting the disk management information.

The controller 111 compares the disk management information obtained from the disk with the specified value in the specified value list to determine whether the disk management information is correct or not. In the case where the error exists in the disk management information corresponding to a predetermined item, the error is corrected when the "possibility of correction" is "possible" for the item, and the error is not corrected when the "possibility of correction" is "impossible".

The controller 111 performs the reproducing operation to the disk only when all the items in which the "possibility of reproduction" is "impossible" are already corrected in the above manner in the disk management information. In other words, the controller 111 does not perform the reproducing operation to the disk when any one of the items in which the "possibility of reproduction" is "impossible" remains in the uncorrected state.

The controller 111 performs the recording operation to the disk only when all the items in which the "possibility of recording" is "impossible" are already corrected in the disk management information. In other words, the controller 111 does not perform the recording operation to the disk when any one of the items in which the "possibility of recording" is "impossible" remains in the uncorrected state.

Figure 5:
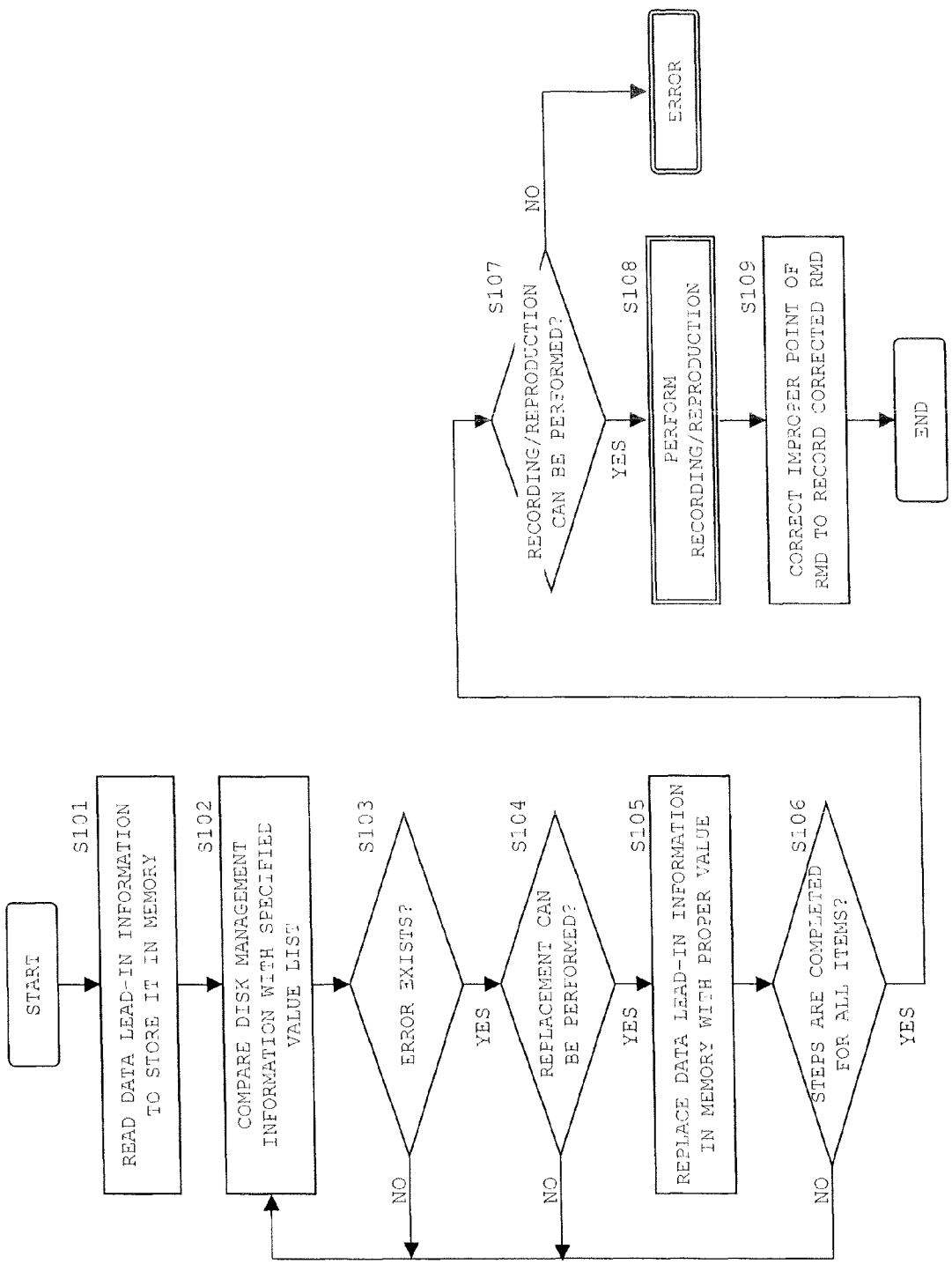
FIG. 5 shows a flowchart in recording and reproducing operations according to an exemplary embodiment.

FIG. 5 is a flowchart showing a processing operation when a user inputs the recording or reproducing command after the disk is loaded in the optical disk apparatus.

When the recording or reproducing command is inputted, the lead-in information is read from the data lead-in area and stored in the memory (S101). Then, the read disk management information is sequentially compared with the information group in the specified value list (S102), and a determination whether the disk management information is correct or not is made for the item of the comparing target (S103). When the error exists in the disk management information (YES in S103), the "possibility of correction" is referred to in the specified value list, and a determination whether or not the disk management information can be corrected is made (S104). When the disk management information can be corrected (YES in S104), the disk management information of the item in the memory is replaced with a proper value (S105). When the disk management information cannot be corrected in the determination of S104, the disk management information of the item in the memory is not corrected.

Steps S102 to S105 are repeated until finished for all the information items of the specified value list (S106). When Steps S102 to S105 are finished for all the information items of the specified value list (YES in S106), a determination whether or not the recording and reproducing operations can be performed is made using the corrected disk management information (S107).

Specifically, in the case where the user inputs the reproducing command, the "possibility of reproduction" of the specified value list is referred to determine whether or not all the items in which the "possibility of reproduction" is "impossible" are corrected to the proper values. When all the items are already corrected, the reproducing operation is permitted to the disk (YES in S107), and the reproduction is performed according to the command from the user (S108).

Similarly, in the case where the user inputs the recording command, the "possibility of recording" of the specified value list is referred to determine whether or not all the items in which the "possibility of recording" is "impossible" are corrected to the proper values. When all the items are already corrected, the recording operation is permitted to the disk (YES in S107), and the recording is performed according to the command from the user (S108).

In the case where the user inputs the recording command, the corrected disk management information is updated according to the recording, and the updated disk management information is recorded in the lead-in area of the disk (S109). Therefore, the data management information in which the error is generated before the recording operation is performed is corrected in the recording operation. Accordingly, in the subsequent recording and reproducing operations, the error-free disk management information is presented to the drive.

Specific examples of the process shown in FIG. 5 will be described below.

FIRST SPECIFIC EXAMPLE

In the single layer type HDDVD-R shown in FIG. 1, usually the start address of the data area is located at 30000h (see "start address of data area" of FIG. 4) and the final address is located at 73543F (see "end address (N) of data area" of FIG. 4) On the other hand, in the case where the drive test zone is additionally provided in the outer circumferential portion, because the data area is decreased, the final address of the data area is located at 73183F (see "end address (A) of data area" of FIG. 4).

In the case where the start address in RMD read from the disk is located at 30001h, the correction is performed to replace the start address 30001h with the start address 30000h specified in the specified value list. The correction is performed because the "possibility of correction" of the "start address of data area" is "possible".

In the case where the final address is located at 73543h although the drive test zone is additionally provided in the outer circumferential portion, the correction is performed to replace the final address 73543h with the final address 73183F specified in the specified value list. The correction is performed because the "possibility of correction" of the "end address (A) of data area" is "possible".

Desirably a confirmation whether or not the drive test zone is extended is made as follows: RMD is referred to confirm the presence or absence of the extension, access is actually gained to the extended area of the outer circumferential portion, and a confirmation whether or not the test writing is performed to the extended area is made by referring to the reproduction RF signal.

After the correction, when the reproducing operation is permitted according to the flowchart of FIG. 5, the user data is read from the start address 30000h. When the recording operation is permitted, because the final address is located at 73183F, the user is informed of a space capacity of the user area, and the like. Therefore, the wrong recording of the user data can be prevented to the drive test zone additionally provided in the outer circumferential portion.

SECOND SPECIFIC EXAMPLE

Information on test recording is retained in RMD. The information includes information for specifying the drive which performs the recording and information on the addresses of test recording areas (hereinafter referred to as "final test recording area") in the inner and outer circumferences where the test recording is finally performed. In the next test recording, the addresses prevent another use of the area already used in the test recording as the test recording area. This enables the test recording to be always performed with the new track.

However, the error is possibly generated in the address. For example, the address of the final test recording area included in RMD deviates possibly from the range defined in the standard. In such cases, when the test recording is performed based on the address, unfortunately the user data is erased by the test recording, or the optimum laser power cannot be set because the test recording is not properly performed.

In the exemplary embodiment, when the address of the final test recording area included in RMD deviates from the range defined in the standard, the error is detected by referring to the specified value list in the memory. In this case, the address range defined in the standard where the test recording can be performed is obtained from the specified value list. Then, the reproduction is sequentially performed from a leading end of the address range, and the final test recording area where the test recording is finally performed is specified based on the reproduction RF signal obtained at that time. The address of the specified final test recording area is replaced with the address of the final test recording area in RMD, and the test recording is performed in the area subsequent to the address.

THIRD SPECIFIC EXAMPLE

As described above, RMD includes the information for specifying the drive which performs the recording to the disk. A reserve area where information is not particularly recorded exists in the drive information setting area, and 00h is recorded in the reserve area. However, random information except for 00h is possibly recorded in the reserve area.

In the exemplary embodiment, the correction is performed to replace the random information in the reserve area with 00h specified in the specified value list. The determination whether or not the recording and reproducing operations can be performed is made according to the flowchart of FIG. 5 based on the corrected RMD.

FOURTH SPECIFIC EXAMPLE

In the RE-PFI area, after the 00h area is set, the disk manufacturer information and the PFI information on the system lead-in area are recorded. However, the disk manufacturer information and PFI information are possibly directly recorded without setting the 00h area, or only the PFI information is possibly recorded even if the 00h area is set. In the exemplary embodiment, the 00h area obtained from the specified value list is set in the RE-PFI area. The disk manufacturer information is obtained from the system lead-in area, and the disk manufacturer information is stored in the corresponding area of the RE-PFI area. The area where the disk manufacturer information is stored is confirmed from the specified value list. The determination whether or not the recording and reproducing operations can be performed is made according to the flowchart of FIG. 5 based on the corrected RE-PFI information.

FIFTH SPECIFIC EXAMPLE

The single layer type HDDVD-R is described above. However, the fifth specific example can also be compatible with a large-capacity dual layer type HDDVD-R by appropriately adding and correcting the items in the specified value list of FIG. 4.

Figure 6:
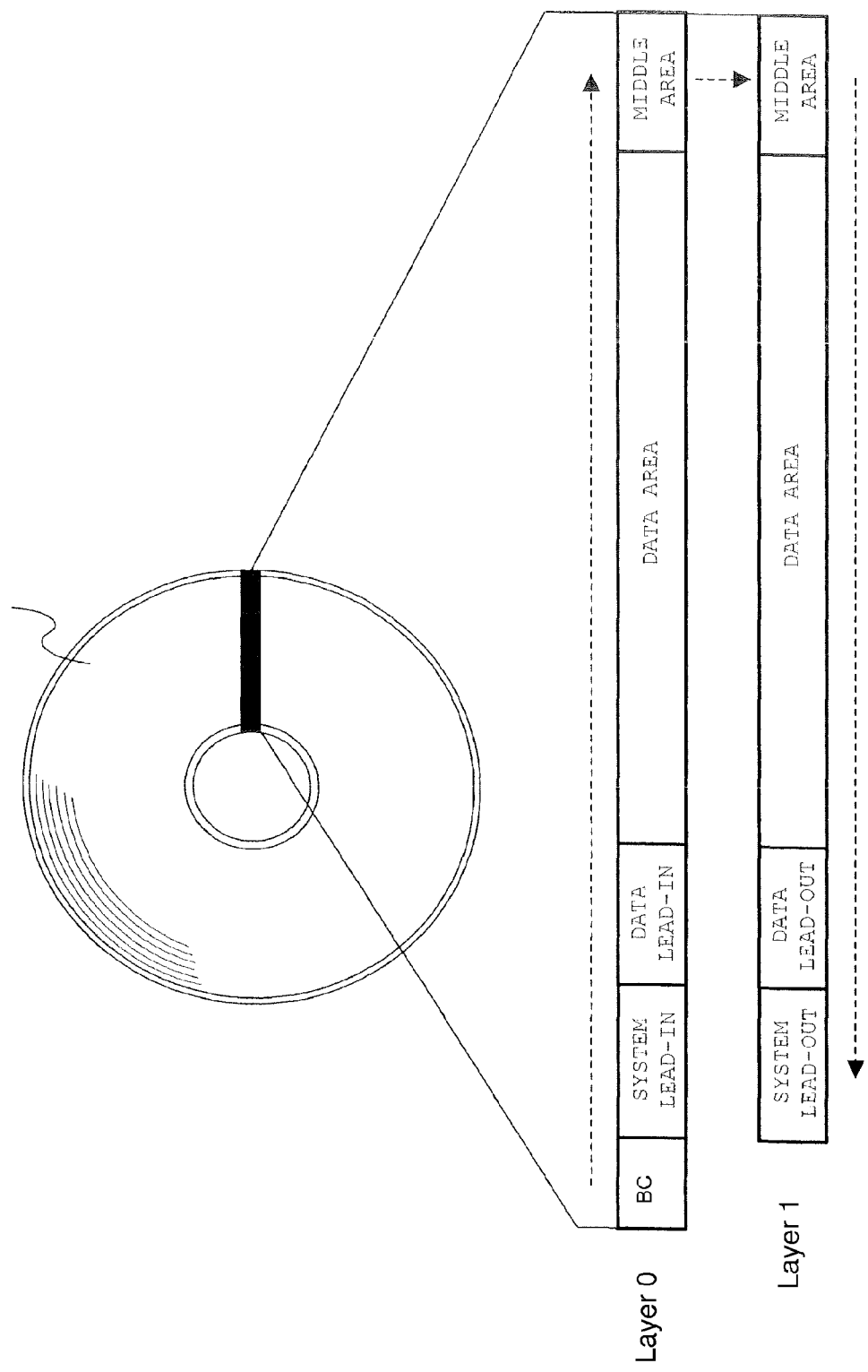
FIG. 6 shows an area format of an optical disk (dual layer type) according to an exemplary embodiment.

As shown in FIG. 6, two recording layers are provided in the dual layer type HDDVD-R, and a middle area is set in a joint portion (disk outer circumferential portion) between a first layer (layer 0) and a second layer (layer 1). That is, a start position and an end position are provided in the user data area of the first layer, and a start position and an end position are also provided in the user data area of the second layer. The dual layer type disk differs from the single layer type disk in that the data start address of the first layer is located at 40000h. In first and second layers of the dual layer type disk, the drive test zones are set in the inner circumferential portion and the outer circumferential portion (middle area) respectively.

The start address and end address of the user data area of each layer, included in RMD, are possibly wrongly located in the dual layer type disk. The information on the presence or absence of the extended drive test zone is possibly wrongly provided.

In the exemplary embodiment, as with the first specific example, the errors are detected by comparing RMD with the specified value list. In the case of the wrong start address and end address of the user data area in each layer, the start address and end address are appropriately replaced with the specified value in the specified value list.

In the case where the user inputs the command for the recording operation, RMD and RE-PFI information corrected in the first to fifth examples are updated according to the recording, and the updated RMD and RE-PFI information are recorded in the lead-in area of the disk. Therefore, the data management information in which the error is generated before the recording operation is performed is corrected in the recording operation. Accordingly, in the subsequent recording and reproducing operations, the error-free disk management information is presented to the drive.

Alternately, information on the improper drive may separately be retained in the memory of the controller 111. In the case where the loaded disk is recorded with the improper drive, the flowchart of FIG. 5 is performed without waiting for the recording or reproducing command, the error of the disk management information is corrected, and the corrected disk management information may be recorded in the data lead-in area of the disk. In this case, a process of informing the user that the previous recording is performed with the improper drive or a particular process of, for example, prohibiting the additional recording to the disk to permit only the reproduction may be performed. Therefore, the user can specify the improper drive, and the number of drives can be decreased without losing the compatibility.

The corrected disk management information cannot be recorded in the case where the disk in which a finalizing process is performed to disable the additional recording is loaded in the optical disk apparatus. In such cases, in the case where the reproduction is permitted according to the flowchart of FIG. 5, an operation for encouraging the user to backup the user data may be performed. Specifically, the operations for, for example, blinking LED and displaying, on a monitor, a message that the backup is recommended due to the improper recording on the disk may be performed.

In the above examples, the process is described when the error exists in the disk management information recorded in the data lead-in area. Additionally, in the case where the error exists in data of the system lead-in area or the data of RMZ (U-RMZ) and border set in the user data area, the error data may be replaced with the regular data to permit the recording and reproducing operations.

For example, it is necessary that bit information for indicating the system lead-out be retained as header information in the system lead-in area. In the case of the improper bit information, the bit information may be replaced with the regular information to permit the recording and reproducing operations.

In the case where U-RMZ or the border is set in the data area, the header information for indicating an attribute of the area is set in each area. In the case of the improper header information, when the information on U-RMZ or the border in RMD is proper, because U-RMZ or the border can correctly be recognized from the proper information, the data reproduction may be permitted by the proper information.

Application of the invention can perform the recording and reproduction to the disk when the disk management information is not correctly read in the disk used for a long time in addition to the disk management information having the error.

Although HDDVD-R is specifically described as the optical disk in the embodiment, an optical disk to which the invention is applied is not limited to HDDVD-R. The invention can be applied to any optical disk apparatus which deals with the recordable and reproducible optical disk. For example, the invention can also appropriately be applied to the optical disk apparatus which deals with HDDVD-RW and Blu-Ray disk.

The optical disk apparatus to which the invention is applied is not limited to the drive used in PC (Personal Computer) and the like. For example, the optical disk apparatus includes a recorder and a camcorder, in which the disk management information is read in performing the recording and reproduction to the optical disk, and an automobile navigation device in which the data is additionally recorded.

Various modifications of the invention can be made without departing from the scope of the technical thought disclosed in claims of the invention.

What is claimed is:

1. An optical disk apparatus which records and reproduces information in and from a recordable disk, the optical disk apparatus comprising: a management information obtaining unit which obtains disk management information from a disk loaded in the optical disk apparatus, the disk management information being used to manage information already recorded in the disk; a management information retaining unit which retains an information group that is stored previous to the disk being loaded in the optical apparatus, the information group corresponding to the disk management information; an error detection unit which compares the disk management information obtained by the management information obtaining unit with the information group retained by the management information retaining unit to detect an error in the disk management information obtained from the disk; an error correction unit which corrects the error of the disk management information detected by the error detection unit into regular information; and a recording and reproducing control unit which performs a recording operation and a reproducing operation to the disk based on the disk management information corrected by the error correction unit, wherein the recording and reproducing control unit generates disk management information which is updated based on the disk management information corrected by the error correction unit, and the recording and reproducing control unit records the generated disk management information in the disk.

2. The optical disk apparatus according to claim 1, wherein correction specifying information is added to each item of the information group retained by the management information retaining unit, the correction specifying information being used to define whether or not the disk management information corresponding to the item can be corrected, and the error correction unit corrects the error of the disk management information when the error of the disk management information is detected for the item in which the correction specifying information defines that the disk management information can be corrected.

3. The optical disk apparatus according to claim 1, wherein the recording and reproducing control unit includes a determination unit which determines whether or not the recording operation and the reproducing operation can be performed to the disk based on the disk management information corrected by the error correction unit, and the recording and reproducing control unit determines whether or not the recording operation and the reproducing operation can be performed to the disk according to the determination result made by the determination unit.

4. The optical disk apparatus according to claim 3, wherein operation specifying information is added to each item of the information group retained by the management information retaining unit, the operation specifying information being used to define whether both or one of the recording operation and the reproducing operation can be permitted when the disk management information corresponding to the item is improper, and the determination unit determines that the recording operation or the reproducing operation can be performed, when the error of the disk management information is corrected for all the items in which the operation specifying information defines that the recording operation or the reproducing operation is not permitted, and the determination unit determines that the recording operation or the reproducing operation cannot be performed, when the error of the disk management information is not corrected for all the items in which the operation specifying information defines that the recording operation or the reproducing operation is not permitted.

5. The optical disk apparatus according to claim 2, wherein the recording and reproducing control unit includes a determination unit which determines whether or not the recording operation and the reproducing operation can be performed to the disk based on the disk management information corrected by the error correction unit, and the recording and reproducing control unit determines whether or not the recording operation and the reproducing operation can be performed to the disk according to the determination result made by the determination unit.

6. The optical disk apparatus according to claim 5, wherein operation specifying information is added to each item of the information group retained by the management information retaining unit, the operation specifying information being used to define whether both or one of the recording operation and the reproducing operation can be permitted when the disk management information corresponding to the item is improper, and the determination unit determines that the recording operation or the reproducing operation can be performed, when the error of the disk management information is corrected for all the items in which the operation specifying information defines that the recording operation or the reproducing operation is not permitted, and the determination unit determines that the recording operation or the reproducing operation cannot be performed, when the error of the disk management information is not corrected for all the items in which the operation specifying information defines that the recording operation or the reproducing operation is not permitted.

* * * * *